United States Patent [19]

Arimoto

[11] Patent Number: 4,580,171

[45] Date of Patent: Apr. 1, 1986

[54] IMAGE PROCESSING METHOD AND SYSTEM

[75] Inventor: Shinobu Arimoto, Musashino, Japan

[73] Assignee: Canon Kabushiki Kaisha, Tokyo, Japan

[21] Appl. No.: 371,016

[22] Filed: Apr. 22, 1982

[30] Foreign Application Priority Data

May 1, 1981 [JP] Japan ................................ 56-65152

[51] Int. Cl.[4] ............................................ H04N 1/00

[52] U.S. Cl. .................................... 358/280; 358/294; 358/287

[58] Field of Search ............... 358/280, 281, 294, 293, 358/903, 286, 258, 287, 7; 355/40, 46

[56] References Cited

U.S. PATENT DOCUMENTS

| | | | |
|---|---|---|---|
| 4,081,843 | 3/1978 | Okano | 358/294 |
| 4,189,744 | 2/1980 | Stern | 358/903 |
| 4,325,086 | 4/1982 | Sato et al. | 358/294 |
| 4,327,380 | 4/1982 | Yamada et al. | 358/268 |
| 4,338,636 | 7/1982 | Yamada et al. | 358/256 |
| 4,342,052 | 7/1982 | Rackley et al. | 358/280 |
| 4,403,249 | 9/1983 | Knop et al. | 358/80 |

*Primary Examiner*—Edward L. Coles, Sr.

*Attorney, Agent, or Firm*—Fitzpatrick, Cella, Harper & Scinto

[57] ABSTRACT

An image processing method and system for forming an image of an original on recording paper sheets comprises a CCD for scanning the image data of the original, an image memory, with an address counter, for storing the image data scanned by the CCD, and a CPU for controlling memory access in accordance with at least one of the scanning area of the original and the memory areas to be accessed. Parallel to serial conversion of the image data and vice versa can be performed to facilitate signal processing. Images of originals of different sizes can be separately reproduced on recording paper sheets of corresponding sizes.

42 Claims, 14 Drawing Figures

FIG. 12
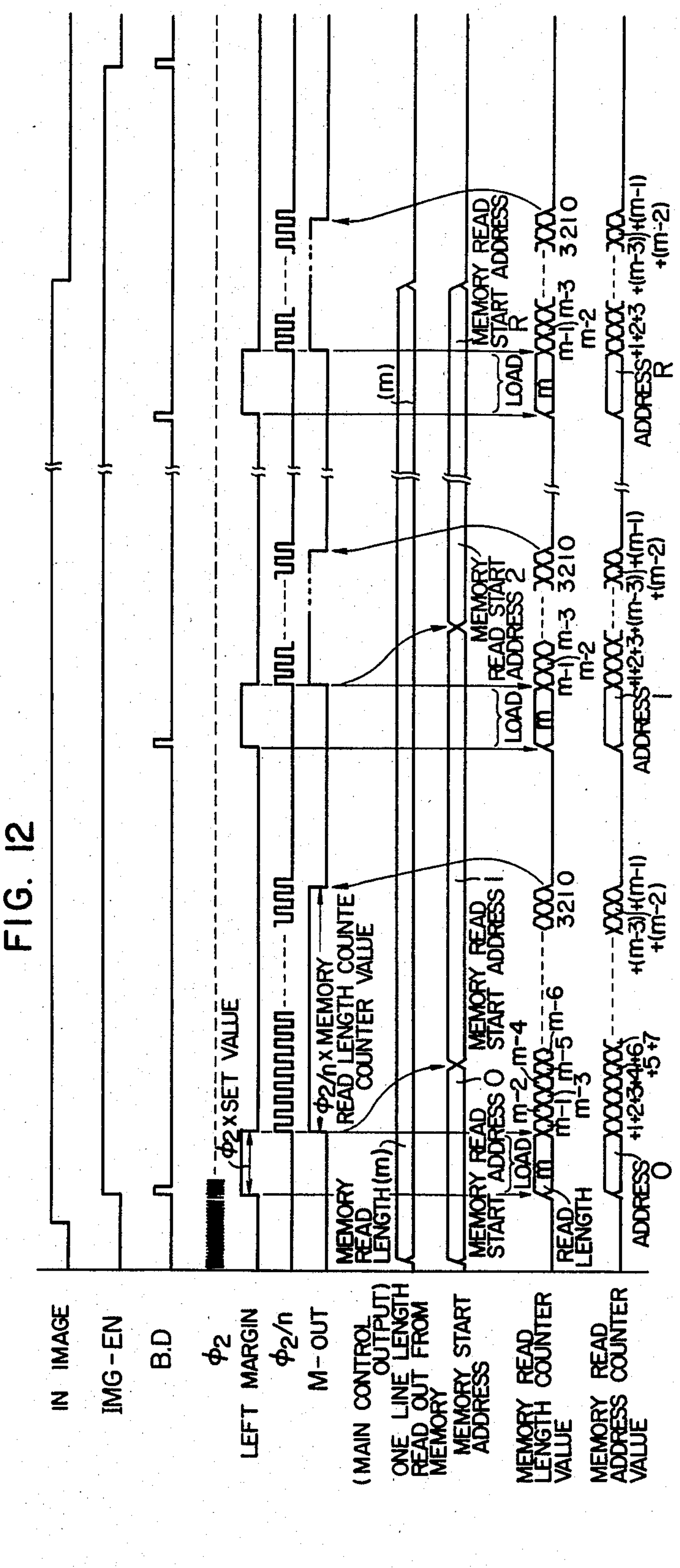
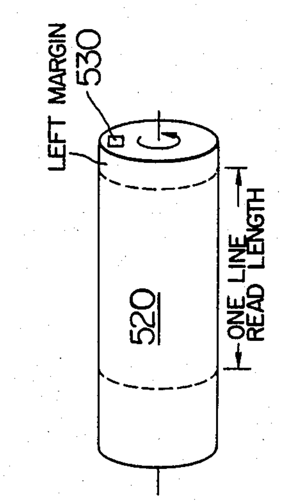
FIG. 13

IMAGE PROCESSING METHOD AND SYSTEM

BACKGROUND OF THE INVENTION

1. Field of the Invention

The present invention relates to a method or system for processing image data.

2. Description of the Prior Art

In a conventional copying apparatus, when a plurality of originals of a size ¼ that of the original table are to be copied, four originals, for example, are arranged on the original table for copying on a single recording paper sheet. Then, the sheet must be cut to the size of the original. Alternatively, the originals are placed on the original table one by one for copying on sheets of the corresponding size. Therefore, such a copying apparatus is inefficient.

Copying apparatus of another type form images on the basis of image data stored in and read out from a line memory or a page memory. In this case, images are formed on sheets of a single size. Therefore, an image may be formed outside the sheet if a recording paper sheet of a different size is used.

Still another apparatus scans an original by means of the relative movement of a CCD and the original. The image data obtained by this scanning operation is stored in a memory. The relative movement is performed over the entire document table. Therefore, scanning may be carried out beyond the memory capacity or the memory area capacity for storing the image data.

In some copying apparatus, memory addresses corresponds to points on the coordinate system defined on the original table. If the original is not placed at a proper position, the desired copy may not be produced.

On the other hand, when the image data of an original is read and converted into electric signals and then these signals are processed to print out images, the processing speed may sometimes be reduced, or an erroneous operation may occur.

SUMMARY OF THE INVENTION

It is an object of the present invention to provide an image processing method and system which eliminates the drawbacks of conventional apparatus as described above.

It is another object of the present invention to provide an image processing method and system in which proper memory access is possible according to the scanning area or the paper size.

It is a further object of the present invention to provide an image processing method according to which image data of a plurality of originals can be simultaneously read by a single scanning operation over the original table to be stored in a memory, and the image data can be separately read out from the memory to produce images on sheets of corresponding sizes.

It is a still further object of the present invention to provide an image processing method and system in which an original can be scanned in accordance with the capacity of the memory areas for storing the image data.

It is a still further object of the present invention to provide an image processing method and system which comprises an image memory of a capacity corresponding to the scanning area on the original table and in which image data is read out from addresses of the image memory corresponding to respective zones of the original table.

It is a still further object of the present invention to provide an image processing method and system in which the access limit of an image memory can be displayed.

It is a still further object of the present invention to provide an image processing method and system in which the access area of an image memory can be displayed.

It is a still further object of the present invention to provide an improvement in a copying system wherein image data of an original is read and converted into electric signals, and these electric signals are stored in a memory and read out for printing.

It is a still further object of the present invention to provide an improvement in a high-speed printing system.

The above and other objects of the present invention will be apparent from the following description of the preferred embodiments thereof.

BRIEF DESCRIPTION OF THE DRAWINGS

FIG. 9, comprising

FIGS. 10 to 12 are respectively operation timing charts for the circuitry of FIG. 9; and FIG. 13 is a perspective view of a photosensitivie drum.

DETAILED DESCRIPTION OF THE PREFERRED EMBODIMENTS

One embodiment of the present invention will now be described below with reference to the accompanying drawings.

Figure 1:
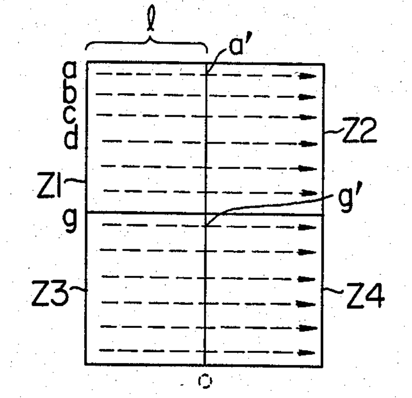
FIG. 1 is a diagram illustrating a scanning area of an original table divided into a plurality of zones of a desired size according to the present invention.

FIG. 1 is a diagram for explaining a process of reading an original when the surface area of an original table is divided into four zones (Z1, Z2, Z3 and Z4), for example. The original is read in the conventional manner wherein a solid scanning element such as a CCD or an optical imaging system for the CCD reciprocates on the stationary original. First, main scanning is performed along the direction indicated by arrow a and then subscanning is performed in the direction perpendicular thereto. Thereafter, main scanning is carried out in the direction indicated by arrow b. Subscanning is performed by the displacement of the CCD or the optical system. Similarly, main scanning and subscanning operations in the directions indicated by arrows c, d to g are repeated to sequentially read the original image in units of picture elements.

Figure 2:
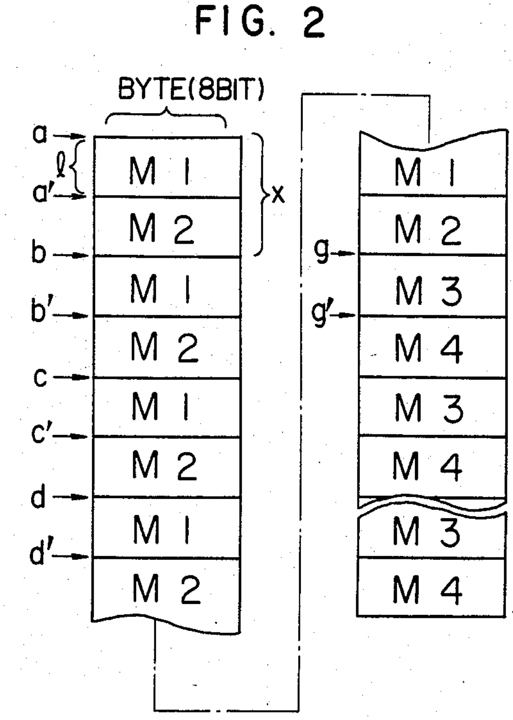
FIG. 2 is a diagram illustrating memory areas corresponding to the divided zones of FIG. 1 according to the present invention.

Image data thus obtained is sequentially written in the predetermined memory areas of an image memory such as a RAM, as shown in FIG. 2. The image data of a byte length l (1 byte=8 bits) can be stored in one memory area M1. The image data obtained by the first main scanning in the direction a is stored at an address a corresponding to two memory areas M1 and M2. In this manner, the image data of one main scanning line X is stored at the addresses b, c to g each corresponding to a set of two memory areas M1 and M2, or M3 and M4. Therefore, the image data read from the zones Z1, Z2, Z3 and Z4 are written in the memory areas M1, M2, M3 and M4, respectively.

Figure 3:
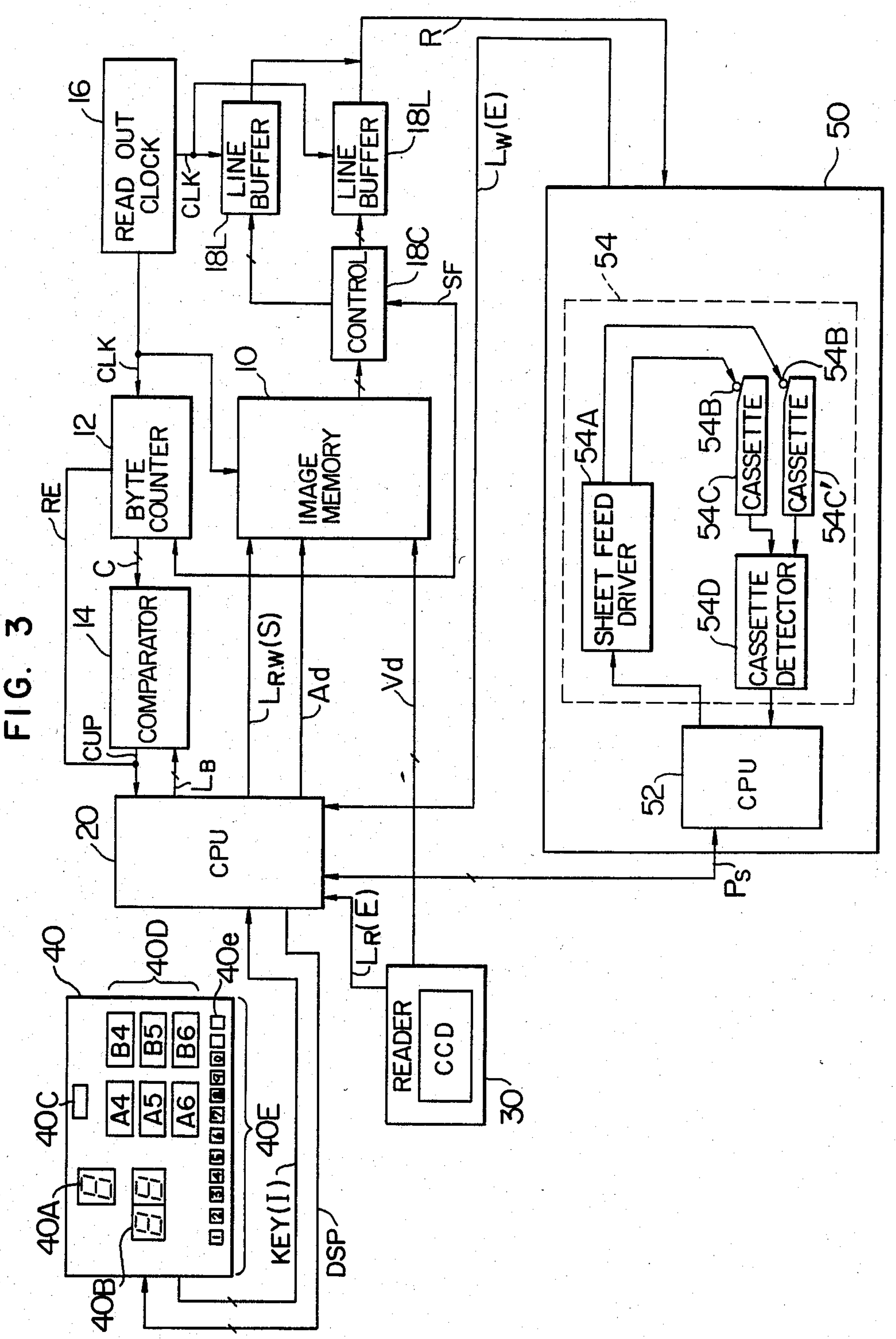
FIG. 3 is a block diagram of an image processing system according to one embodiment of the present invention.

FIG. 3 is a block diagram of a circuitry for storing image data corresponding to the divided zones Z1, Z2, Z3 and Z4 of the original table in an image memory and for reading out the image data therefrom. Referring to FIG. 3, an image memory 10 receives via a signal line Vd the image data read by a known reader 30 having a CCD. The image memory 10 includes an address counter for counting its address. When one readout operation of the CCD is finished, a main scanning end signal is supplied to a CPU 20 via a signal line $L_R(E)$ to output an address signal on a read/write address setting line Ad. The image data is written at the corresponding address of the image memory 10. Also, the CCD starts reading the next line and the obtained image data is stored at the next address. The original is sequentially read in this manner. The image data thus obtained is arranged and stored in the respective predetermined memory areas of the image memory 10 in the manner as shown in FIG. 2.

The image data thus stored is read out from the image memory 10 in response to clocks CLK from a readout clock 16. A byte counter 12 counts these clocks CLK to determine the byte length of the image data (hereinafter referred to as "the transfer data") read out from the memory 10 and to produce a count output C. This count output C is supplied to a comparator 14 to be compared with a preset byte number signal $L_B$ corresponding to the byte length l. When the count output C reaches the preset byte length, the comparator 10 generates a count-up signal Cup and outputs a reset signal RESET to the byte counter 12.

A pair of line buffer memories 18L (hereinafter referred to simply as "the line buffers") output the image data obtained by one main scanning operation of the CCD. In this embodiment, two line buffers are employed for faster operation. A switching circuit 18C such as a multiplexer selects one of the line buffer memories 18L to be used.

An operation instruction input unit 40 comprises a keyboard, for example, which provides operation instructions to a CPU 20. The operation instruction input unit 40 includes a display portion 40A for displaying the number of divided zones; another display portion 40B for displaying the number of copies to be produced; a mode selection key 40C for selecting whether or not division is to be made; an original division size specifying key 40D; and an input portion 40E with a plurality of ten keys 0 to 9, a clear key C, and a read start key 40*e*.

A printer 50 produces hard copies of the image data output from the line buffers 18L. The printer 50 is a line printer such as a laser beam printer consisting of a CPU 52 (including a microcomputer 8080 manufactured by Intel Inc., for example. The CPU 20 may also include an Intel Inc. 8080 microcomputer) and a sheet feed system 54. The sheet feed system 54 has a sheet feed driver 54A for driving sheet feed rollers 54B in response to commands from the CPU 52, and cassettes 54C and 54C' for A6 and A3 size originals, respectively. Either of the cassettes 54C and 54C' is selected at any one time. A cassette size detector 54D detects the cassette size, and a detection signal therefrom is supplied to the CPU 52. In accordance with this detection signal, a cassette of a proper size is selected in response to the key-in operation of one the keys 40D. Further, the memory addresses are selected according to the selected cassette size.

The mode of operation of the above embodiment of the above structure will be described below. A description will be made with reference to a case wherein image data for the zone Z1 of FIG. 1 is read out from the image memory 10. As described above, the image data for Z1 is stored in the memory areas M1 of the image memory, as shown in FIG. 2. Then, the preset byte number signal $L_B$ corresponding to the byte length l of the image data obtained from the zone Z1 by one main scanning operation of CCD of the reader 30 is supplied to the comparator 14. The address (a, a', g or g') and the byte length are determined by the CPU 20 based upon the data entered through one of the keys 40D. In correspondence with the size and position of the zone specified by the one of the keys 40D, the address signal on the read/write address setting line Ad is transferred to the image memory 10 to set a transfer start address. Then, a read start signal $L_{RW}(S)$ is supplied to one line buffer 18L to start transferring the image data. The byte counter 12 counts the clocks CLK to output a count output C representing the transfer byte length to the comparator 10. The comparator 14 compares this count output C with the signal $L_B$. When the count output C reaches the signal $L_B$, the comparator 14 outputs to the CPU 20 a count-up signal Cup representing completion of the transfer of the image data of one main scanning line across the image zone Z1, and also resets the byte counter 12 by the reset signal RESET. The CPU 20 receives the count-up signal Cup from the comparator 14 to change the address counted by the address counter from a to b (FIG. 2). During this time interval, image signals R are read out from the line buffer 18L in response to the readout clocks CLK. The image signals R are input to the printer 50 to record an image of the byte length l on a recording paper sheet fed from the cassette 54C or 54C' for the size of the zone Z1. When recording is completed, the printer 50 produces a read end signal $L_W(E)$.

When the CPU receives the signal $L_W(E)$, a signal for initiating image data transfer for the next main scanning line, that is, another read start signal $L_{RW}(S)$ is supplied to the image memory 10 and to the byte counter 12. Concurrently, a switching signal Sf synchronous with the signal $L_{RW}(E)$ is supplied to a control 18C to switch from one line buffer 18L to another. The image data stored in the memory area M1 at the address b is read out and printed as in the case of that at the address a. In response to another count-up signal Cup from the comparator 14, the CPU 20 again sets the address counted by the address counter from b to c. Also, the CPU 20 supplies another read start signal $L_{RW}(S)$ to the image memory 10 and the byte counter 12, and switches the line buffers 18L, in response to the read end signal $L_W(E)$ from the printer 50. Furthermore, the length of the zone Z1 in the subscanning direction (that is, the number of main scanning lines) is set in the RAM of the CPU 20. The CPU 20 repeats the above operation until the current number of main scanning lines coincides with the preset value. Thus, the image data transfer for Z1 is completed. In this manner, the CPU sequentially presets read start addresses for the respective memory areas M2 to M4 corresponding to the zones Z2 to Z4. The CPU then sequentially and separately outputs the image data stored in the memory areas M2 to M4 onto recording paper sheets of corresponding sizes.

The sheet feed roller of the cassette 54C or 54C' is driven when the transfer of the image data in the memory areas M1 to M3 is completed. Consequently, recording paper sheets are fed in correspondence with the memory areas M2 to M4. Addressing of the memory areas M2 to M4 is performed in response to the start of the feeding operation of sheets corresponding to the zones Z2 to Z4.

In this manner, the byte length l (main scanning length) in the comparator 14 is programmable by the size signal entered through the keys. Furthermore, the subscanning range is also programmable. Therefore, when the original table surface is divided into two or four zones, for example, images on these divided zones can be reproduced on sheets of different sizes. In addition, the readout location of the memory can be automatically selected in accordance with the sheet size required. The read start bit can be selected in accordance with the sheet size, if a line memory is employed.

The reading operation of the reader 30 and storage of the image data in the image memory 10 will be described below in conjunction with the original table.

Figure 4:
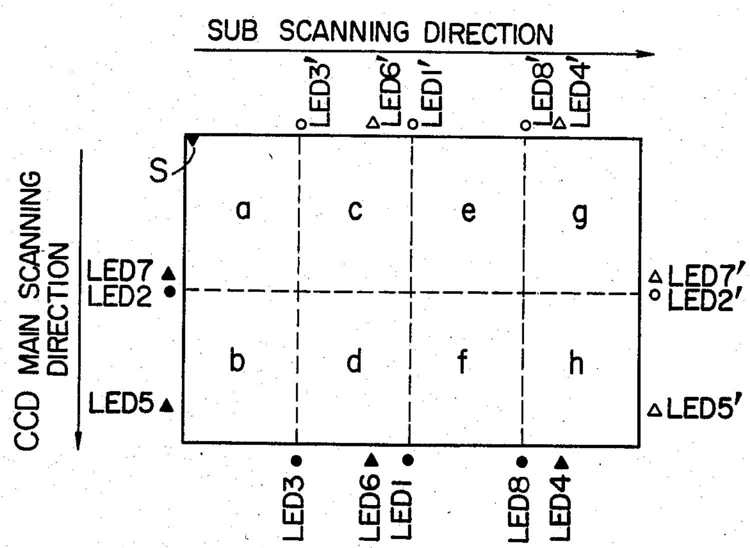
FIG. 4 is a diagram for explaining a division process of the scanning area of an original.

FIG. 4 shows an original table of A3 size. Eight pairs of LEDs 1 and 1' to 8 and 8' for indicating the original position are disposed around the original table. It is now assumed that the original table division mode is specified by the mode selection key 40C of the input unit 40 and one of the division size indicating keys 40D, for example, an key [A6] is operated. Then, the LEDs 1 to 3 and 8 are lit as shown by the dotted lines of FIG. 4 to display the positions to place the original. In this case, up to eight originals may be set. The number of originals is entered through the input portion 40E and displayed at the display portion 40A as the number of used divided zones. When the number displayed at the display portion 40A exceeds the allowable number, the display portion is lit, for example, to disable the key input. If the originals are set in the sequence of a, b, c, d, e, f, g and h to facilitate the operation of the CCD, the subscanning length and the scanning duration are reduced. In the case of four originals of A6 size, they can be placed on the original table in the sequence of a, b, c and d. Then, subscanning is performed up to a position of the LED 1. The readout sequence from the image memory is determined so that the system may be simplified.

The reading operation is started when the read start key 40*e* shown in FIG. 3 is operated. The CPU 20 counts main scanning end signals $L_R(E)$ (H sync) from the reader 30. The count value of $L_R(E)$ is compared with the number of main scanning lines w (subscanning length) determined by the division size and the number of used zones according to the key input. When these two values coincide with each other, the reading operation is completed. Thereafter, the optical scanning system is restored to the home position for the next scanning operation. That is, when the key [A6] and key [4] are operated, the optical system is stopped at a position of the LED 1 and returned to the above position. Alternately, the number of main scanning lines w can be decremented every time the signal $L_R(E)$ is input and subscanning can be stopped when w becomes zero.

Then, the data corresponding to the original table zone a is output from the image memory 10 to the printer 50 in the manner described above. In this case, the preset byte number signal corresponding to the distance from a read start point S to the LED 2 is set in the comparator 14. The main scanning end signals $L_R(E)$ representing the number of H sync signals (main scanning lines) from the read start point S to the LED 3 is supplied to the RAM of the CPU 20. Output of the image data from the memory is thus controlled. Data is sequentially output from the memory areas corresponding to the zones a, b, c and d for printing four copies. Thus, the scanning length is determined in accordance with the size of the memory area accessed.

The original support division size specifying keys 40D are operated so as to select a cassette of the required size (A6 in FIG. 4, for example). In an appropriate case absence of a cassette of the selected size is signalled and the image is formed on a sheet of a larger size.

When an original is placed in the zone a of the original table and the key [A6] as well as the key [1] are operated, the optical scanning system stops scanning at the LED 3 and starts returning. Then, the byte length and address are determined in the manner as described above. The image data is stored in the memory areas corresponding to the zone a. The stored data is read out on the basis of the byte length and address for printing operation onto a sheet of A6 size.

When the normal mode is selected by the mode selection key 40C, the original support division size specifying keys 40D simply function as sheet size selection keys. The number of copies to be made is displayed at the display portion 40B by a display output Dsp from the CPU 20.

Alternatively, the cassette size in the printer may also be used for indicating the original table division size. In this case, original table division size specifying keys 40D are not required. When the original division mode is specified by the mode selection key, 40C, the original table division size is determined by the sheet size of the cassette received in a particular cassette holder (by a signal from the cassette detector 54D). The cassette used is selected by specifying the upper or lower cassette position through a key not shown.

Access control in accordance with the sheet size is possible not only for the readout operation from the image memory, but also for the writing operation into the image memory.

When the image memory comprises a floppy disk, the limit of its storage capacity can be displayed at the display portion 40A. The LEDs of FIG. 4 can be then effectively used for overlaying of a memory image and an original image, since they display access areas of the image memory 10.

Figure 5:
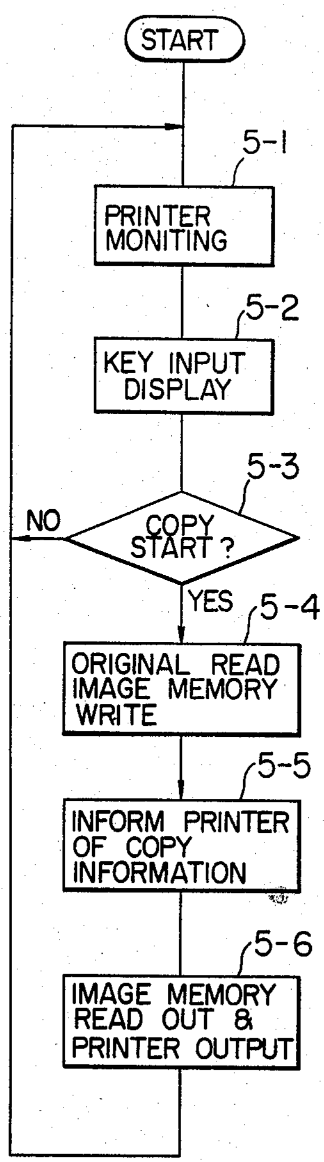
FIGS. 5 to 8 are respectively examples of control flowcharts.

The present invention may be sufficiently understood and practiced with reference to FIGS. 1 to 4, but will now be additionally described with reference to the control flowcharts of FIGS. 5 to 8. These control programs are stored in the ROM in the microcomputer of the CPU 20. FIG. 5 shows a general flow of operation. In step 5-1, the printer 50 is checked for abnormal state. When it is in the normal state, key-in and display operations are performed at the operation instruction input unit 40 (step 5-2). Data entered through the keys is stored in the RAM of the CPU 20. When the read start key 40*e* is operated, the reader 30 is actuated (step 5-3) and the image data is written in the image memory 10

(step 5-4). Then, images are printed out according to the image data read out from the memory in steps 5-5 and 5-6.

Figure 6:
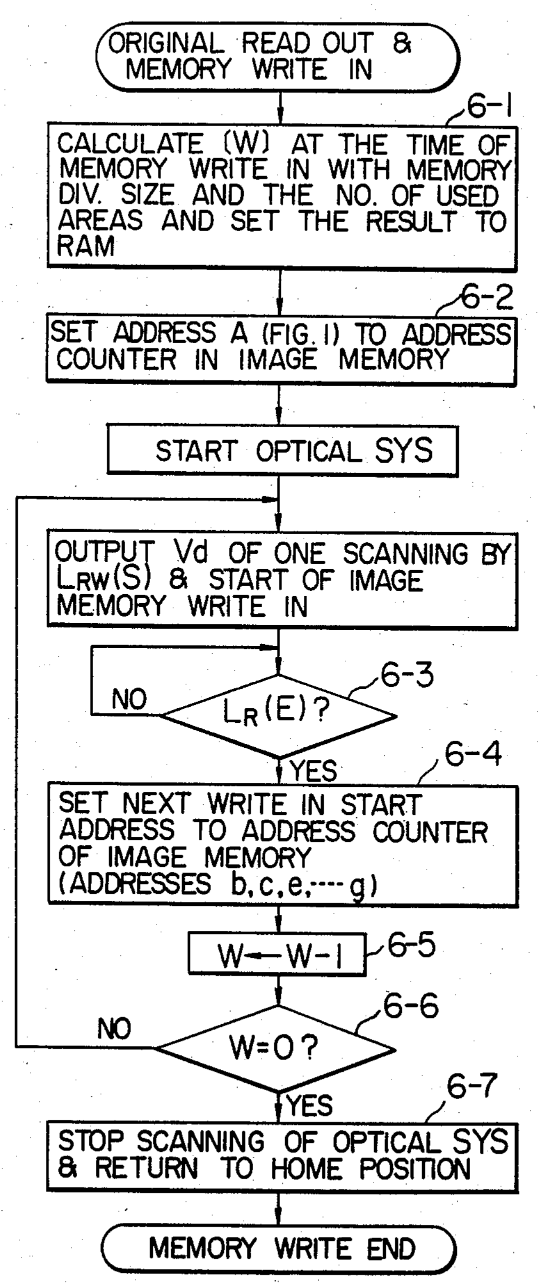

FIG. 6 illustrates the flow of operation in step 5-4 in more detail. As described above, the required number of main scanning lines w is calculated in accordance with the division size and number data entered through the keys 40D and 40E, and then stored in the RAM as in step 6-1. In step 6-2, the start address is set in the address counter in the image memory 10. In step 6-3, it is discriminated if the image data of one scanning line has been stored in the image memory. When YES is obtained in step 6-3, the next start address is set in the address counter (step 6-4). Then, "1" is subtracted from w (step 6-5), and the reading operation of the CCD as well as the writing operation into the image memory are repeated until w becomes zero (step 6-6). When w becomes zero, the optical scanning system is stopped and returned to the start position (step 6-7). The number of main scanning lines w may correspond to the capacity of a floppy disk in step 6-1.

Figure 7:
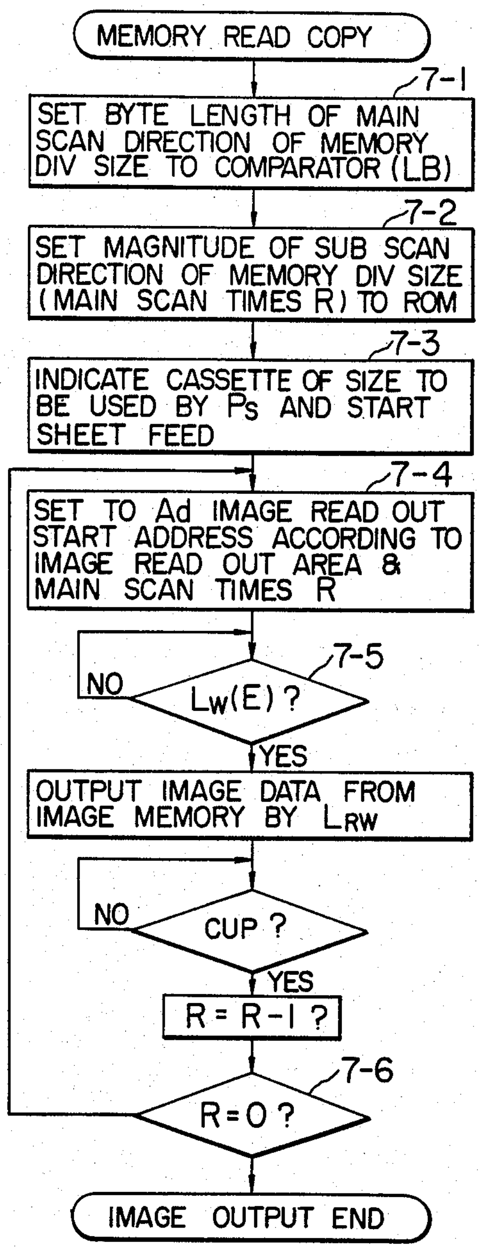

FIG. 7 shows the flow of operation in steps 5-5 and 5-6 of FIG. 5 in more detail. In step 7-1, a preset byte number signal $L_B$ representing a byte length is supplied to the comparator 14 in accordance with the key input data stored in the RAM. Data R indicative of the image size in the subscanning direction is set in the RAM (step 7-2). A cassette of a proper size is specified and sheet feed is started (step 7-3). The read start address is set in the address counter in correspondence with the readout memory areas of the image memory and to size data R (step 7-5). In step 7-5, a signal produced by a laser beam detector of the printer 50 and indicating completion of printing for one line is sensed. If the signal is sensed, image data is output from the image memory 10 and it is discriminated if the byte counter 12 has been counted-up (step 7-6). Then, completion of reading for one main scanning line is determined, and "1" is subtracted from size data R. Reading and printing operations are repeated until size data R becomes zero (step 7-6). When R becomes zero, image output is terminated. In step 7-3, a cassette may be selected by detecting the access memory area of the image memory 10.

Figure 8:
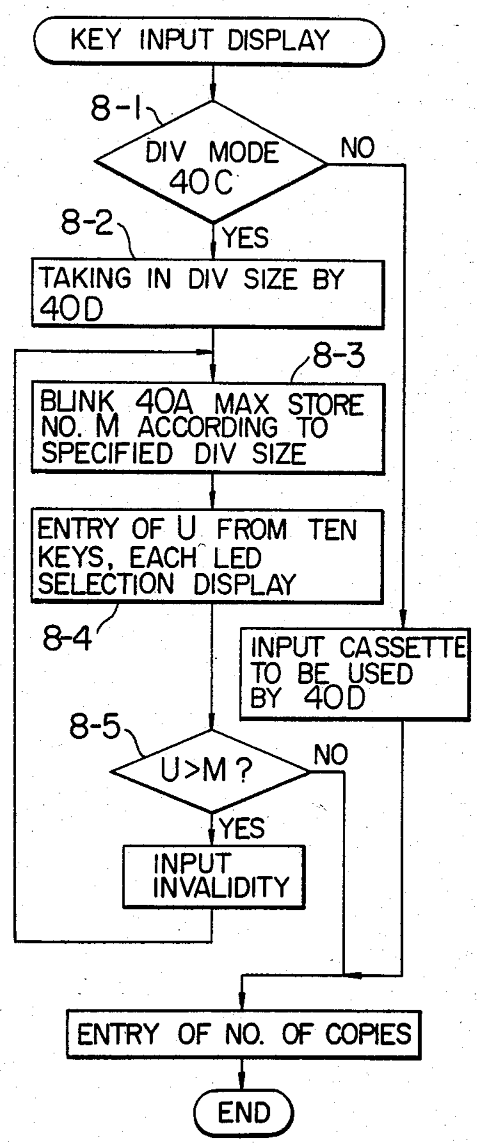

FIG. 8 shows part of the operation flow in step 5-2 of FIG. 5 in more detail. If the division mode is selected by operating the mode selection key 40C, one of the keys 40D is operated (step 8-2). The maximum number M of memory areas available is calculated from the size data entered through the key 40D, and is displayed at the display portion 40A (step 8-3). The ten keys are operated to set the number u of memory areas to be used in the RAM (step 8-4), and then M is compared with u (Step 8-5). If $u>M$, further input by the ten keys and start key is inhibited. If $u<M$, the ten keys are operated to determine the number of copies per memory area. When the mode selection key 40C is not actuated, a cassette size is selected by one of the keys 40D and the number of copies is determined through the ten keys.

Figure 9A:
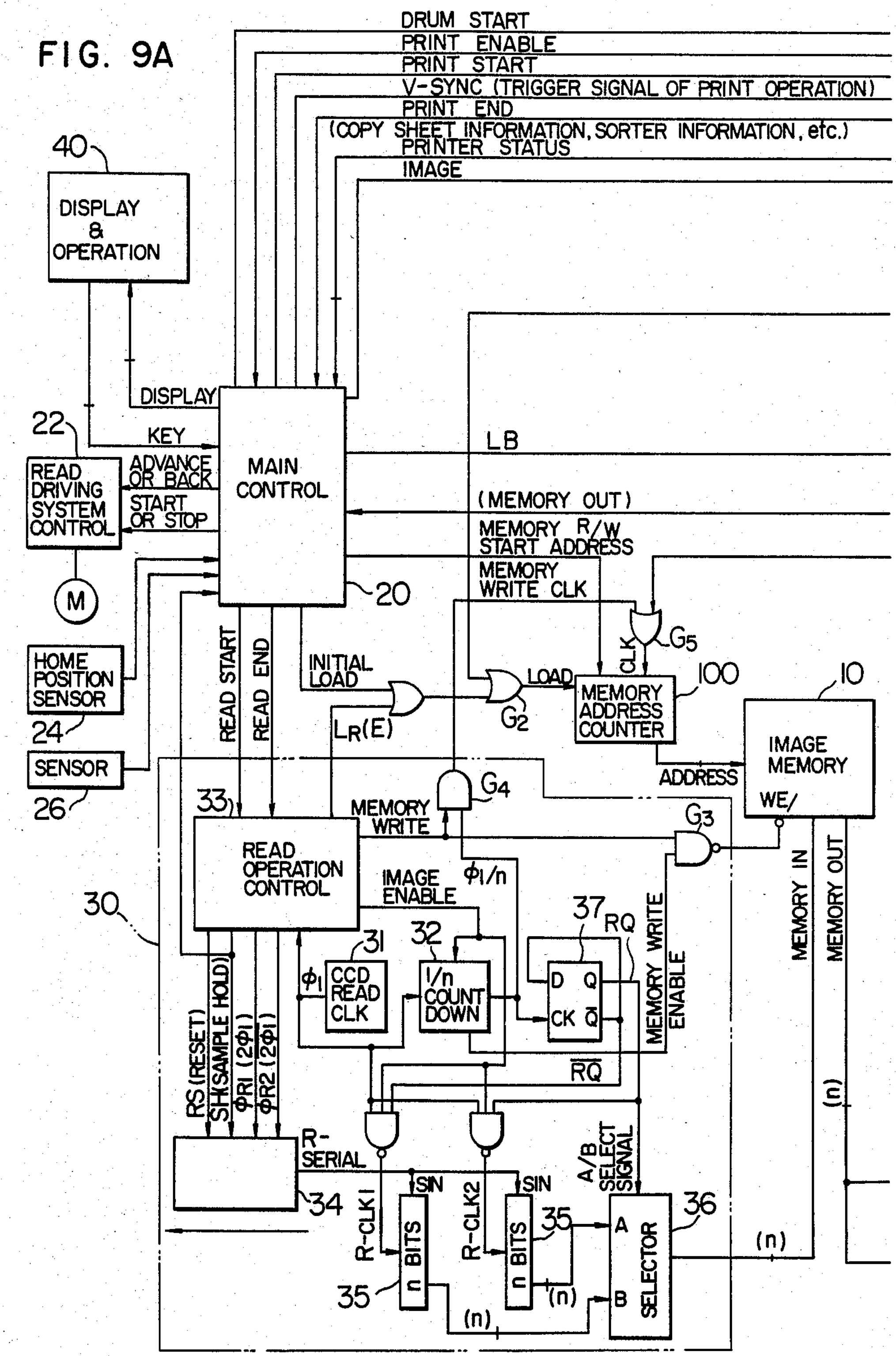
FIGS. 9A and 9B, is a block diagram of an image processing syste according to another embodiment of the present invention.
Figure 9B:
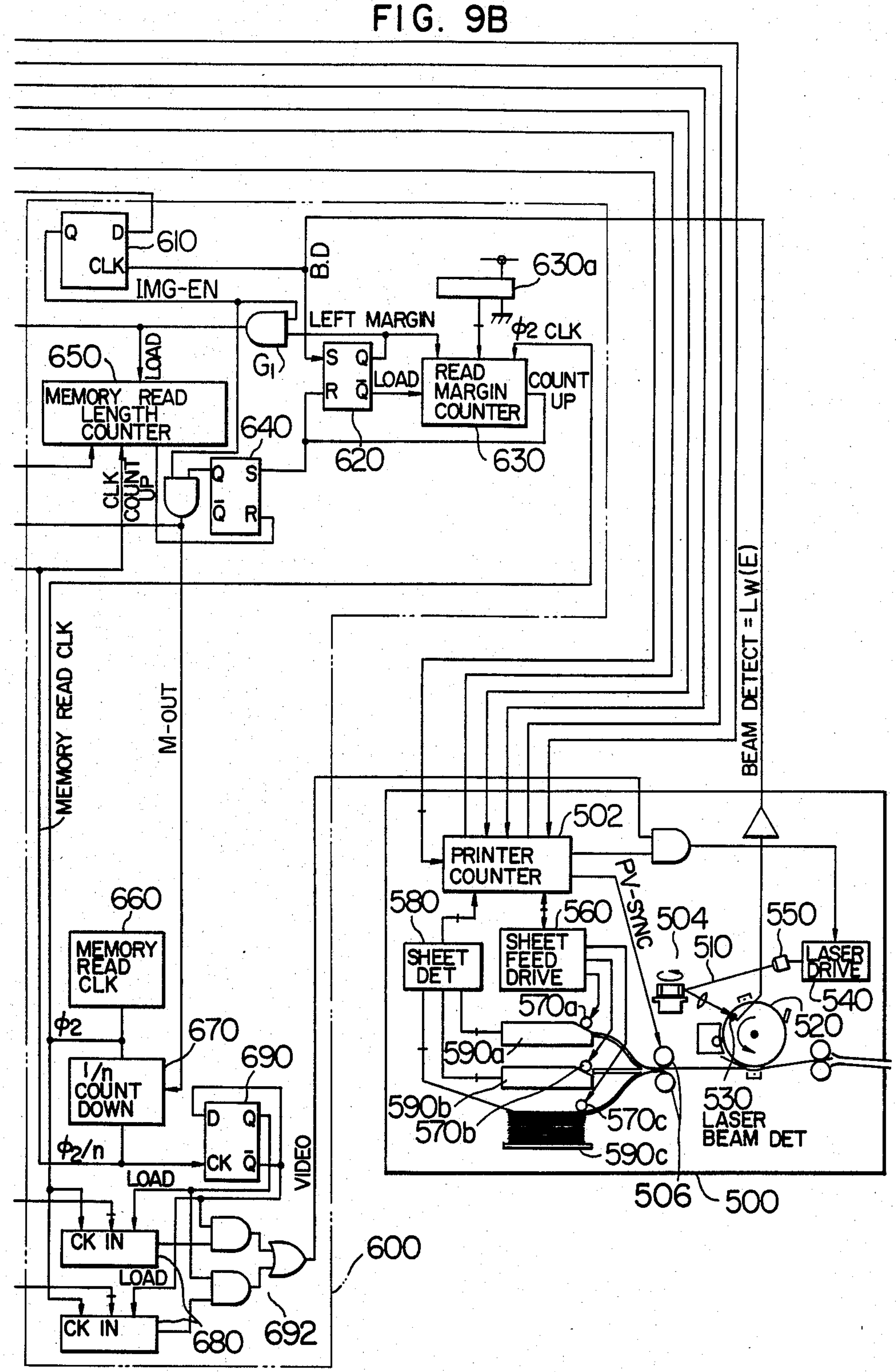

FIG. 9, comprising FIGS. 9A and 9B, shows a block diagram of the circuitry of another embodiment of the invention. A known laser beam printer is employed to provide the following features:

(1) Separate access clock pulse sources are provided for operating the CCD and writing data in the image memory, and for reading out data from the image memory. A common memory access counter is used, so that the circuit is further simplified.

(2) Serial image data output from the CCD is converted into parallel data and then stored in the image memory. Then, the parallel output from the memory is again converted into serial data for output to the printer. Therefore, image data processing is easy.

(3) During the reference left margin setting step, the memory address and image byte length are loaded to the respective counters. As a result, data can be immediately output after the left margin.

(4) Clocks of a reference frequency are frequency-divided to provide pulses for accessing the image memory. These pulses are generated only in the image data duration, whereby erroneous operation is avoided. This second embodiment will now be described in greater detail.

Reader 30

Figure 10:
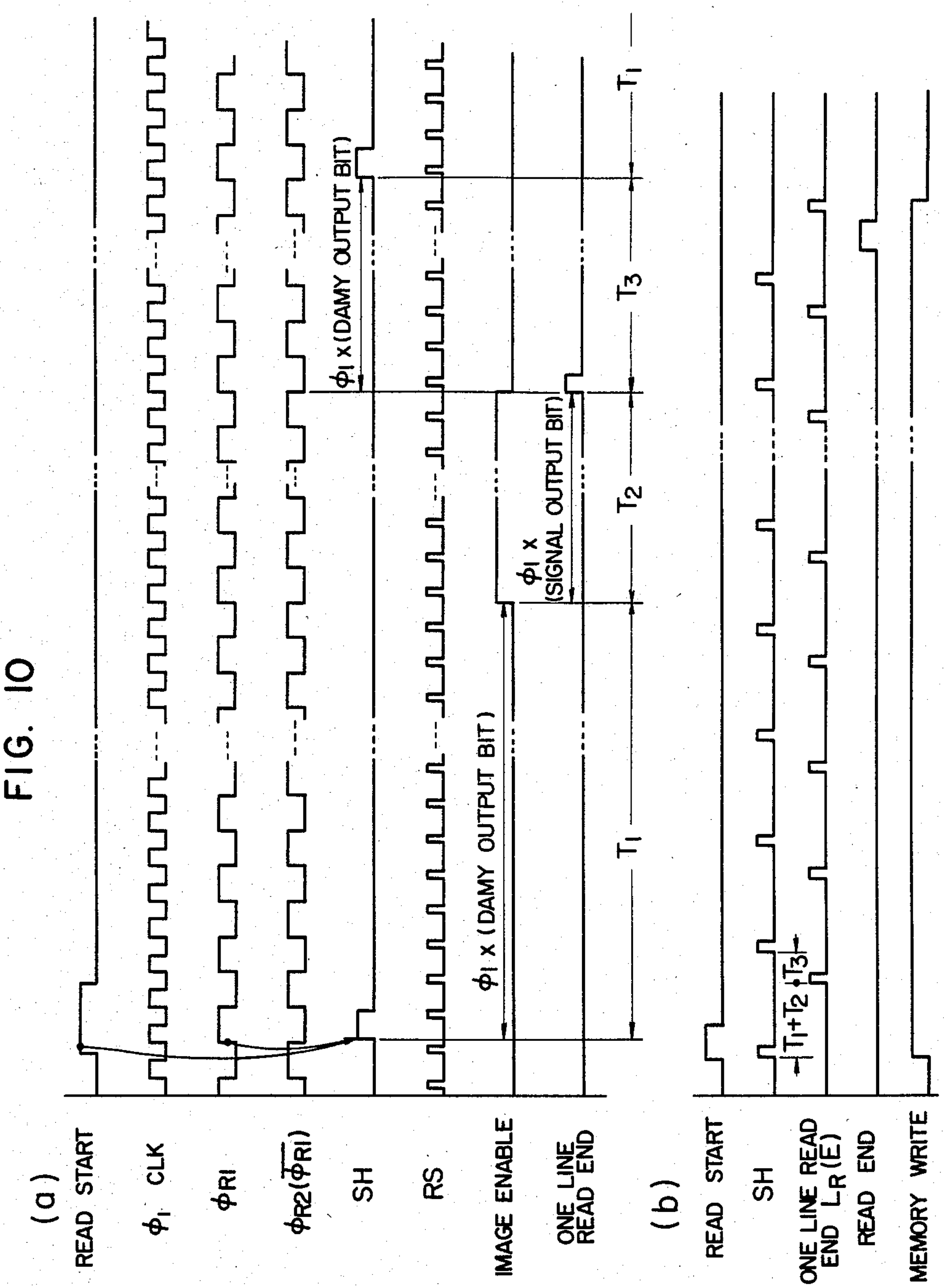

The reader 30 starts image reading operation in response to a read start signal from the CPU or main control 20. The original is read out by a CCD circuit 34. The image data obtained is converted in a binary form and serially output to an R-serial line. This reading operation is controlled by signals RS, SH, $\phi$R1 and $\phi$R2 produced by a READ operation control 33. The control 33 also produces the timing signals to start a series of image reading operations in response to the READ start signal from the CPU 20 as shown in FIG. 10(*a*). The reading operations are performed in synchronism with clocks $\phi$1CLK from a read CLK generator 31. The clock $\phi$CLK is ½ frequency-divided to produce signals $\phi$R1 and $\phi$R2. These signals are out of phase relative to each other by 180 degrees and are supplied to the CCD circuit 34. In response to the read start signal and synchronously with the immediately following leading edge of the signal $\phi$R1, an SH (sample and hold) signal is applied to the CCD circuit 34. In response to this SH signal, the CCD circuit 34 serially outputs image data by the signals $\phi$R1 and $\phi$R2 at the same frequency of the clock $\phi$CLK. However, since a few initial bits are dummy signals, an image enable signal is output at the frequency of $\phi$1CLK for a period of time corresponding to the number of signal output bits (time T2) for time interval T1 corresponding to these dummy output bits from the SH signal. After the clocks $\phi$1CLK are counted for time interval T2, the image ENABLE signal goes to low level and one line read end signal is output for indicating that the reading operation for one line (for one main scanning line) is completed. Thereafter, the clocks $\phi$1CLK are again counted for time interval T3. Then, the SH signal is again produced in synchronism with the leading edge of the signal $\phi$R1 to initiate the reading operation for the next line. A reset signal Rs applied to the CCD synchronously with $\phi$1CLK. FIG. 10(*b*) illustrates the operation timing from start to end of the reading operation. A memory WRITE signal is for writing data in the image memory. This signal rises at the leading edge of the SH signal after the READ start signal, and falls at the trailing edge of the one line read end signal after the read end signal.

Figure 11:
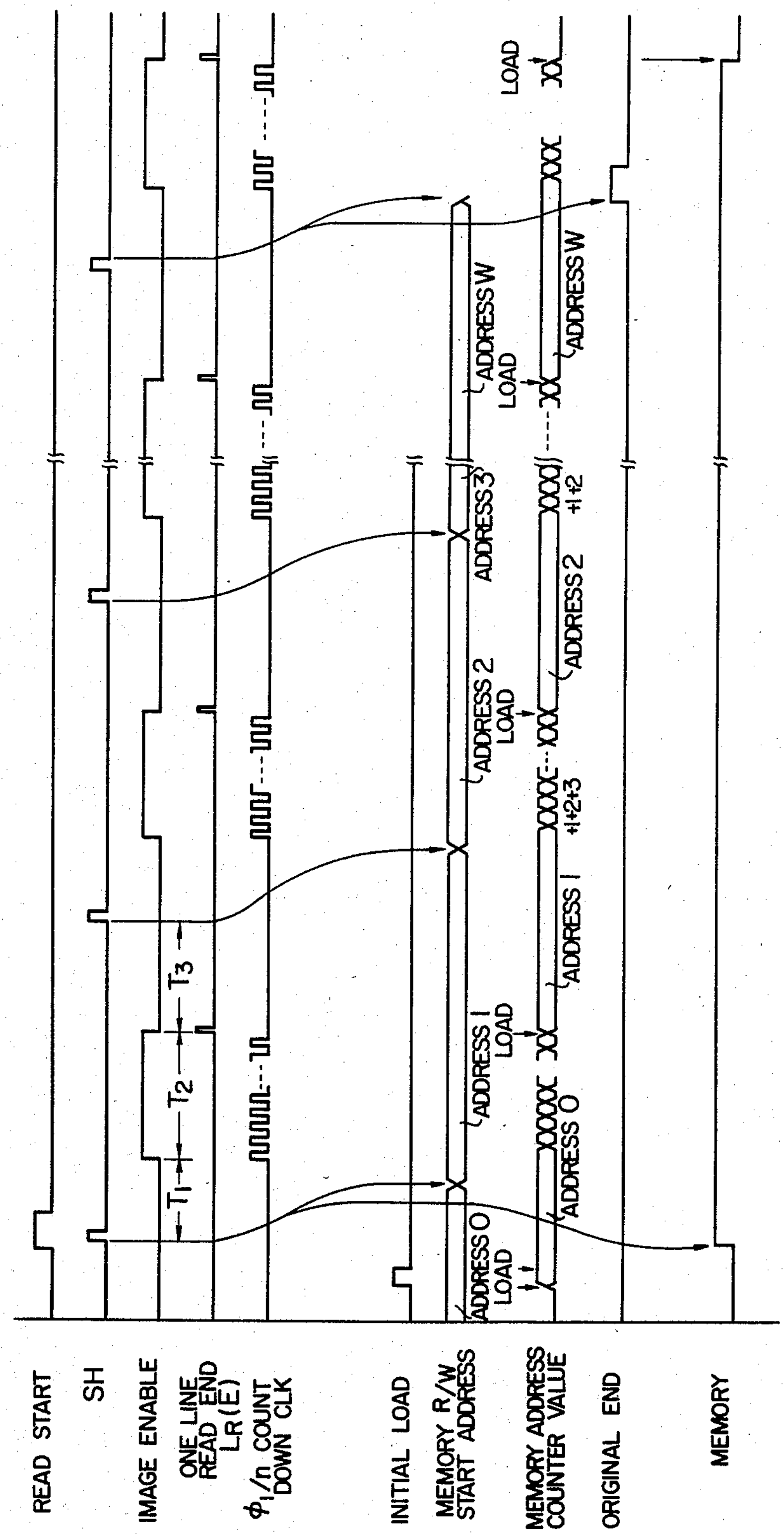

Serial image signals from the CCD circuit 34 are converted into parallel data of n bits by a pair of serial/-parallel converters 35. A 1/n frequency divider circuit 32 shown in FIG. 9 produces an interval signal for every n bits. The frequency divider 32 frequency-divides the clocks $\phi$1CLK to generate $\phi$1/n signals. The frequency division is made during the time interval indicated by T2 of FIG. 11 in which the image EN- ABLE signal remains at high level, that is, effective image signals are output. A toggle flip-flop 37 alternately switches on and off output ends Q and Q in response to the leading edge of the signal $\phi 1/n$ from the 1/n frequency divider 32. The signals RQ and $\overline{RQ}$ from the output ends Q and $\overline{Q}$, respectively, alternately render signals R-CLK1 and R-CLK2 applied to the two serial/parallel converters 35 effective in units of n bits. A selection signal RQ is supplied to a selector 36 to supply, to the image memory 10, the output from the serial/parallel converter 35 to which no clock pulse is applied.

Memory read control 600

Image data is read out from the image memory 10 and output to the printer 500 in synchronism with an IMAGE signal from the CPU 20. A flip-flop (hereinafter referred to simply as "F/F") 610 synchronizes an image ENABLE signal with a horizontal sync signal generated by a laser beam detector 530 upon each scanning operation of a laser beam 510 over a photosensitive drum 520. A memory READ clock 660 produces a reference clock $\phi$2CLK for memory reading operation. A counter 630 counts the margin value from the start of laser beam detection by the laser beam detector 530 up to the image output. The count value of the counter 630 is fixed as indicated by 630*a*. A signal LEFT MARGIN is produced by a flip-flop 620 by indicate that the margin value is being counted. The timing of operation of the above arrangement is shown in FIG. 12. Various load operations are performed by the margin output from a gate G1. A memory READ length counter 650 counts the length of the image formed on the photosensitive drum after the LEFT MARGIN signal. The counter 650 counts the clocks CLK$\phi 2/n$ set by the CPU 20 and obtained by 1/n frequency division of $\phi 2$. A flip-flop 640 is set at the leading edge of the LEFT MARGIN signal and reset by the one line read end signal. The F/F 640 produces an M-OUT signal indicating that one line image data is being written.

A pair of parallel/serial converters 680 convert a parallel MEMORY OUT signal of n bits read out from the image memory into a serial from and serially output the data to the printer at the frequency of $\phi$2CLK.

A toggle flip-flop 690 for controlling switching the two parallel/serial converters 680 inverts its output at a frequency of the signal $\phi 2/n$ for every $\phi 2/n$ bits from the 1/n frequency divider 670. A selector 692 selects serial image signals from the parallel/serial converters 680 in response to the output from the toggle F/F 690 and serially outputs the selected image signals to the printer 500.

Printer 500

Image signals output from the image memory 10 are supplied to a laser driver 540. A laser beam 510 radiated from a semiconductor laser 550 is switched on and off by the laser driver 540. The on-off controlled laser beam is deflected by a scanner 504 in the axial direction across the surface of a photosensitive member 520. Then, an electrostatic latent image is formed on the photosensitive member 520, and a visible toner image is obtained by means of an electrostatic photography process.

A printer controller 502 receives a signal from the CPU 20 to control the sequence of the printer. The printer 500 further includes register rollers 506, sheet feed rollers 570, sheet cassettes of sheet trays 590, a sheet feed driver 560, and a sheet size detector 580.

FIG. 13 shows the arrangement between the photosensitive drum and the left margin. While the margin is scanned, the signal $L_B$ is loaded in the byte length counter 650. Also, the address counter 100 is loaded with start address data, and an image is immediately printed out upon the count-up operation of the margin counter 630. The margin counter 630 counts clocks $\phi$2CLK to define the left margin. Frequency-divided clocks $\phi 2/n$ are produced during the MEMORY OUT signal duration, and frequency-divided clocks $\phi 1/n$ are produced during the image ENABLE signal duration. Writing operation into the image memory is enabled not by CCD clocks but by data transfer clocks through a gate G3. Address counter of the image memory 10 can be used both for reading and writing operations. While data is written, $\phi 1/n$ clocks are input through gates G4 and G5 to enable addressing from the start address. While data is read out, $\phi 2/n$ clocks are applied through a gate 5. Common address data is used for reading and writing. The address data is loaded for reading during initialization or at the end of one line reading operation, and also for writing during the margin setting step. Serial data from the CCD is converted by converters 35 and 36 into parallel data of n bits and transferred to the image memory 10. Then, the parallel data of n bits from the memory is converted into a serial form by the control 600 for transfer to the laser driver.

What I claim is:

1. An image processing system for recording image data on recording media, said system comprising:
   - entry means for entering image-defining data representative of an image to be recorded;
   - storing means for storing the image-defining data entered by said entry means;
   - division means for dividing the image-defining data stored in said storing means into several image data portions which represent separate image areas obtained by dividing in two perpendicular directions an image represented by said entered image-defining data, and for reading out the entered image data portions; and
   - recording means for recording said image areas corresponding to the respective image data portions on respective separate recording media.

2. An image processing system according to claim 1, wherein said division means divides the image-defining data in accordance with at least one of image size and the required number of divided image areas.

3. An image processing system according to claim 1, further comprising means for generating a size signal representing the size of the recording media and wherein said division means divides the image data in response to the size signal generated by said size signal generating means.

4. An image processing system according to claim 1, further including set means for manually setting a size of the image represented by one said image data portion and producing an image signal indicative thereof, and wherein said division means divides the image data in response to the image signal produced by said set means.

5. An image processing system according to claim 1, further including read means for reading an original document to generate image data, and wherein said entry means enters the image data from said read means.

6. An image processing system according to claim 1, further including display means for displaying the state of division of the image data by said divison means.

7. An image processing system comprising:

an original support for receiving first and second originals placed thereon;

read means for reading original images of the first and second originals placed on said original support to generate image data representing the original images;

instruction means for instructing said read means to read the original images;

means responsive to one operation of said instruction means for controlling said read means to cause the first and second originals to be read while received at respective different positions on said original support; and recording means for recording first and second images on respective separate recording media in accordance with first and second image data generated by said read means and respectively representing said first and second original images.

8. An image processing system according to claim 7, wherein said controlling means controls said read means to cause said first and second originals to be read in a single reading operation.

9. An image processing system according to claim 7, wherein said recording means sequentially records said first and second images on said respective separate recording media.

10. An image processing system according to claim 7, further including memory means for storing the image data generated by said read means, said memory means being capable of putting out said first and second image data to said recording means discretely.

11. An image processing system according to claim 7, further including means for displaying positions on said original support at which said first and second originals are to be placed.

12. An image processing system according to claim 7 wherein said read means includes sensor means for reading an original image.

13. An image processing system comprising:

an original support for receiving first and second originals placed thereon at respective different positions;

reading means for reading an original image to generate image data representing the original image means for controlling said reading means to cause said first and second originals to be read while placed at respective different positions on said original support;

recording means for recording first and second images on respective separate recording media in accordance with first and second image data generated by said reading means and respectively representing said first and second original images; and display means for displaying the positions at which said first and second originals are to be placed on said original support for reading by said output means.

14. An image processing system according to claim 13, wherein said recording means sequentially records said first and second images on respective separate recording media.

15. An image processing system according to claim 13 wherein said controlling means controls said reading means to cause said first and second originals to be read in a single reading operation.

16. An image processing system according to claim 13, wherein said display means includes a plurality of display devices adjacent said original support.

17. An image processing system according to claim 13 wherein said display means produces different displays in accordance with the size of the original received on said original support.

18. An image processing system according to claim 13 further including memory means for storing the image data generated by said reading means, said memory means being capable of putting out said first and second image data to said recording means discretely.

19. An image processing system comprising:

an original table for receiving at least one original document thereon;

read means for reading an image of an original document received on said original table;

instruction means for instructing division of said original table on which an original document is placed, into a plurality of areas; and output means for dividing and putting out image data read by said read means as divided image data, in accordance with the division instructed by said instruction means, said instruction means also instructing the size of the areas into which said original table is divided and the number of such areas.

20. An image processing system according to claim 19, further including recording means for recording an image on recording media on the basis of the image data put out by said output means.

21. An image processing system according to claim 19, further including memory means for storing the image data read by said read means, and wherein said output means divides and puts out the image data from said memory means.

22. An image processing system comprising:

read means for reading an original image to generate image data representing the original;

division means for dividing the image data into a plurality of image data portions representing separate image areas of said original image, the number of said image data portions into which any given quantity of entered image data is divided being variable in accordance with at least one of an image size and the required number of divided image areas; and memory means for storing said plurality of image data portions and being capable of putting out said image data portions discretely.

23. An image processing system according to claim 22, further including means for sequentially reading out the image data from said memory means for each of the areas.

24. An image processing system according to claim 23, further comprising means for recording the images represented by the divided image data on recording media different from one another, respectively, on the basis of the image data sequentially read out from said memory means by said reading out means.

25. An image processing system according to claim 22, wherein said memory means is capable of storing said divided image data corresponding to a plurality of documents.

26. An image processing system according to claim 22, further comprising set means for manually setting a size of the image represented by one said image data portion and producing an image signal indicative thereof, and wherein said division means divides the image data in response to the image signal produced by said set means.

27. An image processing system according to claim 22, further comprising means for generating a size signal representing the size of the recording media and wherein said division means divides the image data in response to the size signal generated by said size signal generating means.

28. An image processing system for recording images on recording media, said system comprising:

entry means for entering image data obtained by reading an original image;

division means for dividing image data into a plurality of image data portions representing separate image areas of said original image, the number of said image data portions into which any given quantity of entered image data is divided being variable in accordance with at least one of an image size and the required number of divided image areas; and recording means for recording the image areas corresponding to the respective image data portions divided on respective separate recording media.

29. An image processing system according to claim 28, further comprising memory means for storing the image data entered by said entry means, and wherein said division means divides and sequentially reads out the image data from said memory means.

30. An image processing system according to claim 28, further comprising set means for manually setting the size of the image represented by one of said image data portions and producing an image signal indicative thereof and wherein said division means divides the image data in response to the image signal produced by said set means.

31. An image processing system according to claim 28, further including means for generating a size signal representing the size of the recording media and wherein said division means divides the image data in response to the size signal generated by said size signal generating means.

32. An image processing system comprising:

entry means for entering image-defining data;

storing means for storing the image defining data entered by said entry means;

division and readout means for dividing the image-defining data stored in said storing means into a plurality of image data portions representing separate image areas and for reading out the image data portions; and recording means for recording a said image areas corresponding to respective image data portions on respective separate recording media, the number of said image data portions into which any given quantity of stored image data is divided being variable according to the required number of said image areas to be recorded.

33. An image processing system according to claim 32, further comprising means for instructing the required number of said image areas to be recorded.

34. An image processing system according to claim 32, wherein said storing means is capable of storing image-defining data corresponding to a plurality of documents.

35. An image processing system according to claim 32, wherein said entry means reads the image of an original document to generate the image-defining data.

36. An image processing system according to claim 32, further including display means for displaying the state of division of the image-defining data by said division and read out means.

37. An image processing system comprising:

reading means for reading an original image to generate image data representing the original image;

division means for dividing the image data generated by said reading means into several image data portions and for putting out the image data portions, said image data portions representing separate image areas obtained by dividing in two perpendicular directions an image represented by said generated image data; and recording means for recording said image areas corresponding to the respective image data portions on respective separate recording media.

38. An image processing system according to claim 37, wherein said division means divides the image-defining data in accordance with at least one of image size and the required number of divided image areas.

39. An image processing system according to claim 37, further comprising set means for manually setting a size of the image represented by one said image data portion and producing an image signal indicative thereof, and wherein said division means divides the image data in response to the image signal produced by said set means.

40. An image processing system according to claim 37, further comprising means for generating a size signal representing the size of the recording media and wherein said division means divides the image data in response to the size signal generated by said size signal generating means.

41. An image processing system according to claim 37, further comprising memory means for storing the image dated read by said read means, and wherein said division means divides and sequentially reads out the image data from said memory means.

42. An image processing system according to claim 37, further including display means for displaying the state of division of the image-defining data by said division and read out means.

* * * * *

UNITED STATES PATENT AND TRADEMARK OFFICE
CERTIFICATE OF CORRECTION

PATENT NO. : 4,580,171 . Page 1 of 3

DATED : April 1, 1986

INVENTOR(S) : SHINOBU ARIMOTO

It is certified that error appears in the above-identified patent and that said Letters Patent is hereby corrected as shown below:

Column 2, line 38, change "syste" to --system--; and line 42, change "photosensitivie" to --photosensitive--.

Column 4, line 37, change "RESET." to --RE.--.

Column 5, line 34, change "an key" to --a key--.

Column 6, line 18, change "case absence" to --case, absence--; line 40, change "key, 40C," to --key 40C,--; and line 45, change "key not" to --key, not--.

Column 8, line 53, change "Rs applied" to --Rs is applied--.

Column 9, line 3, change "Q and Q" to --Q and $\overline{Q}$--; line 9, change "A selection" to --The selection--; and

UNITED STATES PATENT AND TRADEMARK OFFICE
CERTIFICATE OF CORRECTION

PATENT NO. : 4,580,171

DATED : April 1, 1986

INVENTOR(S) : SHINOBU ARIMOTO

It is certified that error appears in the above-identified patent and that said Letters Patent is hereby corrected as shown below:

Column 9, line 28, change "by indicate" to --to indicate--.

Column 11, lines 41-42, change "7 wherein" to --7, wherein--;
line 49, change "original image" to --original image;--; and
line 68, change "13 wherein" to --13, wherein--.

Column 12, line 7, change "13 wherein" to --13, wherein--; and
line 11, change "13 further" to --13, further--.

Column 13, line 45, change "image defining" to --image-defining--; and
line 52, change "a said" to --said--.

UNITED STATES PATENT AND TRADEMARK OFFICE
CERTIFICATE OF CORRECTION

PATENT NO. : 4,580,171

DATED : April 1, 1986

INVENTOR(S) : SHINOBU ARIMOTO

It is certified that error appears in the above-identified patent and that said Letters Patent is hereby corrected as shown below:

Column 14, line 16, change "read out" to --readout--;
line 49, change "dated" to --data--; and
line 55, change "read out" to --readout--.

Signed and Sealed this

Thirtieth Day of December, 1986

*Attest:*

DONALD J. QUIGG

*Attesting Officer*

*Commissioner of Patents and Trademarks*